May 4, 1954   W. A. MARTIN   2,677,741
DIAPHRAGM TYPE ACTUATOR, FULCRUM, AND SEAL
Filed Dec. 1, 1950

Inventor
Wilbert A. Martin
By
McCanna and Morsbach
Attys.

Patented May 4, 1954

2,677,741

UNITED STATES PATENT OFFICE 2,677,741

DIAPHRAGM TYPE ACTUATOR, FULCRUM, AND SEAL

Wilbert A. Martin, Freeport, Ill., assignor to Minneapolis-Honeywell Regulator Company, Minneapolis, Minn., a corporation of Delaware Application December 1, 1950, Serial No. 198,672

6 Claims. (Cl. 200—168)

This invention relates to an actuator and to a novel pivotal support therefor, an important embodiment being an enclosed gas filled or evacuated device such as a precision snap acting switch.

The invention is herein shown and described in connection with a sealed precision switch; though plainly not limited to such use. Small precision switches have many uses wherein the spring system is arranged to operate in an enclosure either evacuated or filled with gas under pressure. In such switches the spring system is located in a sealed chamber and an operating lever is mounted for access from the outside of the casing. One difficulty with such switches is to provide a support member for the lever that can be sealed to the lever and to the switch body so as to provide a positively sealed chamber while at the same time providing a fixed fulcrum for the lever. A serious problem in connection with devices of this character is the practical difficulty of sealing a rotary bearing and the fact that where a flexible membrane is employed the sealing member tends to move into and out of the switch when pressure is applied to the operating lever or with changes in atmospheric pressure outside the switch housing, so that the position of the pivotal axis about which the lever swings changes, thereby changing the operating characteristics of the switch.

An object of the invention is the provision of a novel actuator for a switch or the like comprising a flexible fulcrum and a lever secured thereto for flexing the fulcrum to transmit rotary motion therethrough.

Another object of this invention is to provide a combined fulcrum and seal for a lever operated switch or the like that has a relatively long life, that is capable of being positively sealed to a housing, that is inexpensive to produce, and that is positive in its action.

Another object of the invention is the provision of a metallic fulcrum and seal permitting maximum flexure in a plane at right angles to a plane having the greatest resistance to flexure.

A further object of the invention is the provision of a metallic fulcrum adapted for mounting a lever in the wall of a sealed chamber so constructed that rotation of the lever on the fulcrum occasions substantially no change in the volume of the chamber.

Other objects and advantages of the invention will become apparent from the following detailed description taken in connection with the accompanying drawings, in which—

Figure 1:
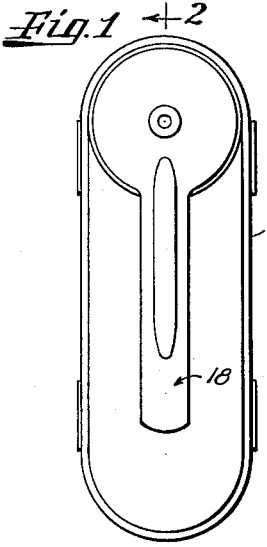
Figure 1 is a top plan view of a snap action switch embodying the present invention.
Figure 2:
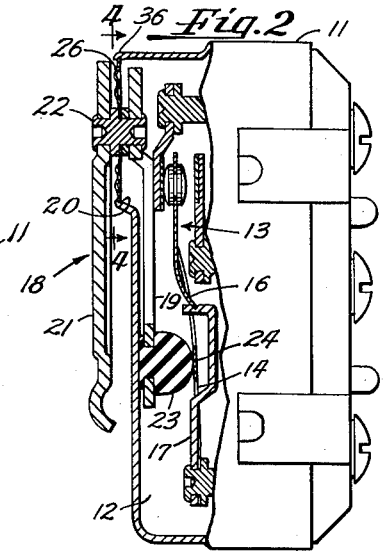
Fig. 2 is a sectional view taken substantially along the lines 2—2 of Figure 1.
Figure 3:
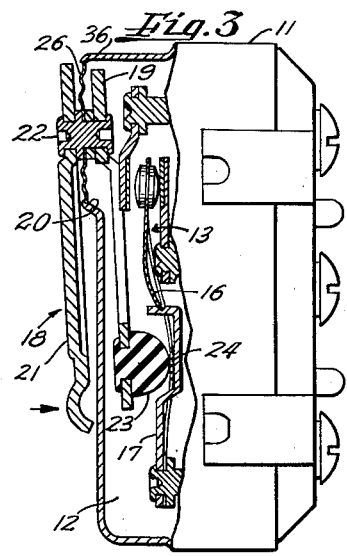
Fig. 3 is a fragmentary sectional view similar to Fig. 2 with the lever in its operating position.

The invention is shown embodied in an actuator for a precision snap acting switch. For purposes of illustrating the invention the snap acting switch shown is of the totally enclosed gas filled type and includes a housing 11 having a chamber 12 for the reception of a snap spring system 13 including tension and compression members 14 and 16 anchored on a bracket 17 suitably supported in the chamber 12. The spring system is actuated by an operating lever 18 including an internal arm 19 disposed in the chamber 12, an external arm 21 in parallel relation with the arm 19 and spaced outwardly from the top of the switch housing and a rivet 22 securing the arms together and extending through an opening 20 formed in the top of the housing as shown in Figs. 2 and 3. The internal arm 19 is provided with a dome-shaped projection 23 shaped to engage a bridging portion 24 interconnecting the tension members 14. The snap spring system and arms 19 and 21 are arranged so that the opening 20 in the housing 11 through which the rivet 22 extends is formed near one end of the housing and the arm 19 extends lengthwise of the housing to engage the bridging portion 24 and the arm 21 is in spaced parallel relation to the arm 19 and also extends lengthwise of the switch housing as best shown in Figs. 1 and 2. In other embodiments of the invention the lever 18 may take other shapes and forms and lie in planes other than those herein shown.

Figure 4:
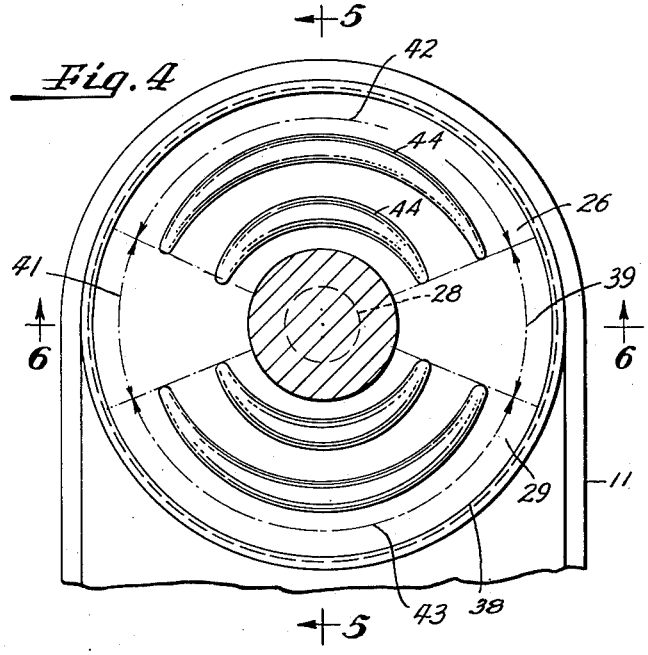
Fig. 4 is a sectional view taken substantially along the line 4—4 of Fig. 2.
Figure 5:
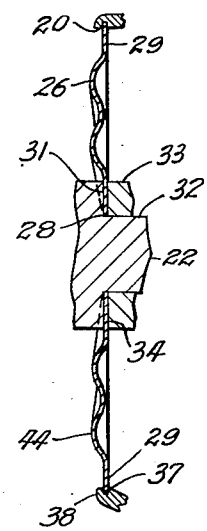
Fig. 5 is a sectional view taken substantially along the line 5—5 of Fig. 4.
Figure 6:
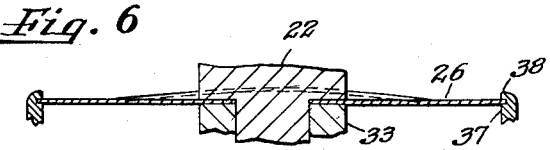
Fig. 6 is a sectional view taken substantially along the line 6—6 of Fig. 4.

One phase of the invention is concerned with a novel combined seal and fulcrum that is capable of supporting the lever 18 so that the latter may be swung about a fixed pivot and that also provides a positive seal between the lever and the housing 11 to insure the maintenance of a preselected atmosphere in the housing. As best seen in Figs. 4, 5 and 6 the fulcrum and seal member is a diaphragm 26 having a central opening defined by an inner peripheral edge 28 and an outer perimeter 29. The inner peripheral edge 28 is adapted to be in sealed relation with the lever 18. To this end, as best seen in Figs. 4 and 5, the rivet 22 is formed with an annular shoulder 31 shaped to abut against one side of the diaphragm 26 and a portion 32 having a reduced cross-sectional area, the latter being shaped to be snugly received within the opening defined by the peripheral edge 28 in the diaphragm 26. A spacer 33 fitting over the portion 32 forms a shoulder 34 engageable with the opposite side of the diaphragm. Flaring of the extreme outer ends of the rivet as shown in Figs. 2 and 3 secures the arms 19 and 21 to the rivet and also secures the inner peripheral edges of the diaphragm between the shoulders 31 and 34. To insure a positive seal, the rivet 22, spacer 33, and the area 27 adjacent the edge 28 of the diaphragm 26 are tinplated and after the components have been assembled as shown, the unit is heated so that the tin flows and seals the joint.

The outer perimeter 29 is also in sealed relation to the switch housing 11. In the embodiment shown, the top of the housing 11 is formed with an outwardly projecting boss 36 adjacent one end of the housing having internal dimensions slightly less than the outer dimensions of the diaphragm 26 and an outside diameter slightly greater than the diaphragm. The boss 36 is formed with a counterbore for receiving the diaphragm, the bottom of the counterbore forming a shoulder 37 against which the perimeter of the diaphragm abuts. The remaining wall portion 38 of the counterbored boss is deformed inwardly over the outwardly facing edge at the perimeter of the diaphragm so as to secure the diaphragm in position as best shown in Figs. 5 and 6. To insure a fluid-tight seal the joints may be sealed by tinplate as described hereinbefore.

In the embodiment of the invention herein shown the diaphragm, which is otherwise flat, is formed with opposed corrugated portions or segments 42 and 43 on diametrically opposite sides of the inner edge 28, Figs. 4 and 5, each of which comprises radially spaced concentric corrugations 44, the ends of which are annularly spaced by flat portions or segments 39 and 41 extending diametrically outward from the inner edge 28 in the form of a flat band or area extending transversely across the diaphragm and preferably coplanar with the perimeter 29. As best seen in Fig. 4, the annular length of the portions 39, 41, 42 and 43 preferably increases progressively in a radial direction from the centerline of the inner edge 28 and the corrugations 44 are of maximum width and height at their centers and taper progressively toward the ends so as to merge into the plane of the transverse band as shown in Fig. 6.

In this embodiment of the invention, each corrugated portion 42 and 43 has two arcuate-shaped corrugations 44. It is to be understood, however, that more or less corrugations may be used depending on the size and shape of the diaphragm, and that the corrugations may have other shapes. The corrugations 44 in the corrugated portions of the diaphragm 26 increase the flexibility of these portions in the direction of desired motion, permitting movement with respect to the flat portions 39 and 41. This differential flexibility of the diaphragm 26 is of primary importance in the invention, since, as previously described, the diaphragm 26 is positioned so that the plane of the longitudinal axis of the lever 18 is intermediate the flat portions 39 and 41 and bisects the corrugated portions 42 and 43. The pivotal axis about which the lever 18 swings is thus in effect an axis or line that extends transversely across the diaphragm in the relatively flat portions 39 and 41. With this construction the lever pivots about an axis defined by the most rigid portions of the diaphragm and the flexing of the diaphragm occurs primarily in the more flexible corrugated portions thereof. Under these conditions stressing of the parts is controlled in a predetermined manner so as to insure maximum operating life of the seal and diaphragm.

The invention contemplates a diaphragm formed of a substantially inelastic material which does not stretch appreciably by elongation in order to prevent the diaphragm from moving axially of the rivet 22 in and out of the housing, and thereby change the operating characteristics of the switch or other mechanism operated by the actuator. By elongation is meant an increase in the total surface area of the diaphragm. The preferred material is metal but a metal diaphragm if made in the form of a flat disk will not withstand the necessary elongation at least over an appreciable number of operations. In the present invention, the material of the diaphragm at the corrugations flexes to make the corrugations at one side of the lever attachment shallower than their normal configuration. This provides the material for permitting the diaphragm to be extended at this side of the lever attachment and avoids elongating the material of the diaphragm to effect this extension of the diaphragm. The transverse band, being uncorrugated, causes the axis to remain in a fixed position. If the diaphragm is supported to prevent movement of its outer periphery, it must be extensible not only along the plane through which the lever moves, but also perpendicular to this plane, and in that event the corrugations must be such as to permit the diaphragm to be extended by flexing of the material of the diaphragm at the corrugations in both of these directions. This can best be accomplished by making the corrugations curved as shown in Fig. 4. It will be observed that straight corrugations tend to stiffen along the length of the corrugation, whereas if a curved corrugation is restrained at each end while a transverse force is applied intermediate its ends, the corrugation tends to pivot about its ends so that it does not oppose deflection of the diaphragm but might be said to assist it. Angles and sharp bends in the corrugations should be avoided as stress raisers, that is, stresses are concentrated at such locations and may easily exceed the elastic limit of the metal. It will be seen that the shape of the diaphragm at the perimeter is relatively unimportant and a wide variety of patterns for the corrugations may be employed within the scope of the invention. It is possible to use discontinuous corrugations if the discontinuities are properly located and other provision is made for extending the diaphragm in the direction of the discontinuities. Due to the rigidity of the flat portions 39 and 41 and the manner in which they are supported, the latter do not move appreciably into and out of the housing with a pumping action upon application of pressure to the actuator 18 and thereby change the volume and pressure characteristics of the gas in the chamber 12 in the switch housing 11. In this construction it is apparent that when one of the corrugated portions flexes inwardly of the chamber 12 the other flexes outwardly a substantially equal amount so that the volume and pressure in the switch housing 11 do not change appreciably. Also with this construction the rigidity of the flat portions 39 and 41 insures that the pivotal axis does not move with

I claim:

1. An actuator assembly comprising a thin resilient diaphragm of substantially planar configuration, means for rigidly mounting the diaphragm at its periphery, said diaphragm being formed with a flat planar portion in the form of a flat band extending across the diaphragm between spaced opposed portions of the periphery of the diaphragm, said diaphragm being formed at opposite sides of said flat portion with corrugated areas, said corrugated areas in the diaphragm being extensible in a direction toward said flat band with the diaphragm being extended by flexing of the material of the diaphragm at said corrugations and with the material of the diaphragm twisting at an axis disposed in said flat band and extending thereacross between said spaced opposed portions of the periphery of the diaphragm without elongating the material of the diaphragm, a lever attached to said flat portion of the diaphragm at a central portion thereof spaced from the periphery of the diaphragm, and means for mounting said assembly for operative pivotal movement of the lever about said axis of the diaphragm disposed in said flat band, said corrugated areas each having a plurality of crescent-shaped corrugations extending, in spaced relation from the lever attachment, from said flat band of the diaphragm at one side of the lever attachment to said flat band of the diaphragm at the opposite side of the lever attachment to permit extension of the diaphragm by flexing at said corrugations, in a direction parallel to the plane in which the lever moves while at the same time avoiding elongating the material of the diaphragm, said flat band and said corrugated areas of the diaphragm blending into each other to present a progressive development from a flat state to a corrugated state, the corrugations increasing progressively from their ends to corrugations of major intensity midway between their ends along the diameter at right angles to the aforementioned axis of the diaphragm.

2. An actuator assembly comprising a thin resilient diaphragm of substantially planar configuration, means rigidly mounting the diaphragm at its periphery, said diaphragm being formed with a flat planar portion in the form of a flat band extending across the diaphragm between spaced opposed portions of the periphery of the diaphragm restraining the diaphragm from bodily translatory movement with respect to said mounting means and normally maintaining the diaphragm in its substantially planar configuration, a lever attached to said flat band of the diaphragm at a central portion thereof spaced from the periphery of the diaphragm, the diaphragm at opposite sides of said flat band being formed with corrugated areas, said corrugated areas each having a plurality of crescent-shaped corrugations extending around the lever attachment in spaced relation therefrom from said flat band of the diaphragm at one side of the lever attachment to said flat band of the diaphragm at the opposite side of the lever attachment, said corrugated areas in the diaphragm being extensible in a direction toward an axis of the diaphragm lying in said flat band and extending thereacross between said spaced opposed portions of the periphery of the diaphragm by flexing of the material of the diaphragm at said corrugations to permit the diaphragm to be extended in said direction and to permit twisting of the diaphragm at said axis lying in said flat band without elongating the material of the diaphragm, said corrugated areas in the diaphragm being extensible in a direction toward the ends of the crescent-shaped corrugations by flexing of the material of the diaphragm at said corrugations to permit the diaphragm to be extended in said direction without elongating the material of the diaphragm, means for mounting said assembly for operative pivotal movement of the lever about said axis lying in said flat band of the diaphragm, and means at the inner side of the diaphragm positioned to be actuated by said lever upon said operative movement thereof.

3. An actuator assembly comprising a thin diaphragm of flexible, substantially non-stretchable material and substantially planar in configuration, a rigid support fixedly mounting the diaphragm at its periphery, said diaphragm being formed with a flat planar portion in the form of a flat band extending across the diaphragm between spaced opposed portions of the periphery of the diaphragm restraining the diaphragm from bodily translatory movement with respect to said mounting means and normally maintaining the diaphragm in its substantially planar configuration, a lever attached to said flat band of the diaphragm at a central portion thereof spaced from the periphery of the diaphragm, the diaphragm at opposite sides of said flat band being formed with corrugated areas, said corrugated areas each having a plurality of curved corrugations extending around the lever attachment in spaced relation therefrom from said flat band of the diaphragm at one side of the lever attachment to said flat band of the diaphragm at the opposite side of the lever attachment, flat planar portions of the diaphragm separating the corrugations at each corrugated area, said corrugated areas in the diaphragm being extensible in a direction toward an axis of the diaphragm lying in said flat band and extending thereacross between said spaced opposed portions of the periphery of the diaphragm by flexing of the material of the diaphragm at said corrugations to permit the diaphragm to be extended in said direction and to permit twisting of the diaphragm at said axis lying in said flat band without elongating the material of the diaphragm, said corrugated areas in the diaphragm being extensible in a direction toward said flat band by flexing of the material of the diaphragm at said corrugations to permit the diaphragm to be extended in said direction without elongating the material of the diaphragm, means for mounting said assembly for operative pivotal movement of the lever about said axis lying in said flat band of the diaphragm, and means at the inner side of the diaphragm positioned to be actuated by said lever upon said operative movement thereof.

4. In an actuator assembly, the combination of a substantially flat planar diaphragm of flexible, substantially non-stretchable material, and a rigid support connected to said diaphragm around the periphery thereof and fixedly mounting the periphery of the diaphragm, said diaphragm being formed with a flat planar portion in the form of a flat band passing through the middle of the diaphragm and extending across the diaphragm between spaced opposed portions of the periphery of the diaphragm restraining the diaphragm from bodily translatory movement with respect to said support and normally maintaining the diaphragm in its substantially planar configuration, the diaphragm at opposite sides of said flat band being formed with corrugated areas having crescent-shaped corrugations extending around a central area of said flat band at the middle of the diaphragm from said flat band of the diaphragm at one side of said central area to said flat band of the diaphragm at the opposite side of said central area, said corrugated areas in the diaphragm being extensible in a direction toward an axis of the diaphragm lying in said flat band and extending across the diaphragm through said central area of the flat band between said spaced opposed portions of the periphery of the diaphragm by flexing of the material of the diaphragm at said crescent-shaped corrugations to permit the diaphragm to be extended in said direction and to permit twisting of the diaphragm at said axis lying in said flat band without elongating the material of the diaphragm, said flat band in the diaphragm and said fixed mounting of the periphery of the diaphragm on said support restraining the diaphragm from flexing about an axis extending through said corrugated areas in the diaphragm.

5. In an actuator assembly for a switch, the combination of a substantially flat planar diaphragm of flexible, substantially non-stretchable material, a switch housing connected to said diaphragm around the periphery thereof and fixedly mounting the periphery of the diaphragm, and a U-shaped lever attached to said diaphragm at the center thereof and having spaced, parallel arms extending at opposite faces of the diaphragm away from the attachment of the lever to the diaphragm, said diaphragm being formed with a flat planar portion in the form of a flat band extending across the diaphragm transversely of the direction in which said spaced lever arms extend and extending through said center thereof between spaced opposed portions of the periphery of the diaphragm restraining the diaphragm from bodily translatory movement with respect to said switch housing and normally maintaining the diaphragm in its substantially planar configuration, the diaphragm at opposite sides of said flat band being formed with corrugated areas having curved corrugations extending around the lever attachment from said flat band of the diaphragm at said one side of said center thereof to said flat band of the diaphragm at the opposite side of said center thereof, said corrugated areas in the diaphragm being extensible in a direction toward an axis of the diaphragm lying in said flat band and extending across the diaphragm through said center thereof between said spaced opposed portions of the periphery of the diaphragm by flexing of the material of the diaphragm at said corrugations to permit the diaphragm to be extended in said direction and to permit twisting of the diaphragm at said axis lying in said flat band without elongating the material of the diaphragm when said lever is pivoted about said axis, said flat band in the diaphragm and said fixed mounting of the periphery of the diaphragm on said switch housing restraining the diaphragm from flexing about an axis extending through said corrugated areas in the diaphragm to thereby restrain the lever against pivoting about an axis extending through said corrugated areas in the diaphragm.

6. In a switch assembly, the combination of a switch housing formed at one side with a hole and a rigid annular flange extending around said hole and projecting outward from the switch housing, a substantially planar disk of flexible, substantially non-stretchable metal supported fixedly around its entire periphery by said flange and extending across said hole in the switch housing, a U-shaped lever attached to the center of said risk and having spaced, parallel arms, one of said lever arms extending along the outside of said switch housing away from said one end thereof and toward the opposite end of the switch housing and the other of said lever arms extending in the same direction inside the switch housing, and switch operating mechanism within said switch housing located between the ends of the switch housing and positioned to be engaged by said other lever arm to operate the switch, said diaphragm being formed with a flat planar portion in the form of a flat band extending diametrically across the diaphragm transversely of the direction in which said lever arms extend restraining the diaphragm from bodily translatory movement with respect to said switch housing and normally maintaining the diaphragm in its substantially planar configuration, the diaphragm at opposite sides of said flat band being formed with corrugated areas having corrugations extending around the attachment of the lever to the diaphragm from said flat band of the diaphragm at said one side of said center thereof to said flat band of the diaphragm at the opposite side of said center thereof, said corrugated areas in the diaphragm being extensible toward an axis of the diaphragm lying in said flat band by flexing of the material of the diaphragm at said corrugations to permit the diaphragm to be extended in said direction and to permit twisting of the diaphragm at said axis lying in said flat band without elongating the material of the diaphragm when said lever is pivoted about said axis, said flat band in the diaphragm and said fixed mounting periphery of the diaphragm on said switch housing restraining the diaphragm from flexing about an axis extending through said corrugated areas in the diaphragm to thereby restrain the lever against pivoting about an axis extending through said corrugated areas in the diaphragm.

References Cited in the file of this patent

UNITED STATES PATENTS

| Number | Name | Date |
|---|---|---|
| 2,468,512 | Riche | Apr. 26, 1949 |

FOREIGN PATENTS

| Number | Country | Date |
|---|---|---|
| 499,874 | Great Britain | Jan. 23, 1939 |